US012770851B2

(12) United States Patent
Kovarik et al.

(10) Patent No.: US 12,770,851 B2
(45) Date of Patent: Oct. 20, 2026

(54) LIQUID TRANSPORT SYSTEM HAVING MULTIPLE NEBULIZER NOZZLES

(71) Applicant: DH Technologies Development Pte. Ltd., Singapore (SG)

(72) Inventors: Peter Kovarik, Markham (CA); John J. Corr, Markham (CA)

(73) Assignee: DH Technologies Development Pte. Ltd., Singapore (SG)

( * ) Notice: Subject to any disclaimer, the term of this patent is extended or adjusted under 35 U.S.C. 154(b) by 323 days.

(21) Appl. No.: 18/293,399

(22) PCT Filed: Jul. 28, 2022

(86) PCT No.: PCT/IB2022/057023
§ 371 (c)(1),
(2) Date: Jan. 30, 2024

(87) PCT Pub. No.: WO2023/012619
PCT Pub. Date: Feb. 9, 2023

(65) Prior Publication Data
US 2024/0331992 A1 Oct. 3, 2024

Related U.S. Application Data

(60) Provisional application No. 63/228,117, filed on Aug. 1, 2021.

(51) Int. Cl.
*H01J 49/04* (2006.01)
*H01J 49/16* (2006.01)

(52) U.S. Cl.
CPC ........ *H01J 49/045* (2013.01); *H01J 49/0404* (2013.01); *H01J 49/0431* (2013.01); *H01J 49/0445* (2013.01); *H01J 49/167* (2013.01)

(58) Field of Classification Search
CPC .. H01J 49/0404; H01J 49/0431; H01J 49/045; H01J 49/0445; H01J 49/165; H01J 49/167
See application file for complete search history.

(56) References Cited

U.S. PATENT DOCUMENTS 5,223,226 A 6/1993 Wittmer et al.
6,501,073 B1 * 12/2002 Mylchreest ........... H01J 49/107 250/288

(Continued)

FOREIGN PATENT DOCUMENTS

CN 104422727 A 3/2015
EP 1963024 9/2008

(Continued)

OTHER PUBLICATIONS

Hager et al., "Product ion scanning using a Q-q-Q linear ion trap (Q Trap) mass spectrometer", Rapid Communications in Mass Spectrometry, 2003; 17: 1056-1064.

(Continued)

*Primary Examiner* — Wyatt A Stoffa

(57) ABSTRACT

A liquid handling system for a mass spectrometer (MS), the liquid handling system including an open port interface (OPI) including a body defining a port and an internal volume. At least one removal conduit is disposed in the body and fluidically coupled to the internal volume. A plurality of transfer conduits is fluidically coupled to the at least one removal conduit. A single one of a plurality of nebulizer nozzles are fluidically coupled to each of the plurality of transfer conduits.

15 Claims, 10 Drawing Sheets

(56) References Cited

U.S. PATENT DOCUMENTS

| | | | | |
|---|---|---|---|---|
| 6,841,774 | B1 * | 1/2005 | Weiss | H01J 49/0495 250/288 |
| 7,399,961 | B2 * | 7/2008 | Chen | G01N 30/7266 250/281 |
| 7,717,544 | B2 * | 5/2010 | Stearns | B05B 12/004 347/68 |
| 7,923,681 | B2 | 4/2011 | Collings et al. | |
| 10,770,277 | B2 * | 9/2020 | Datwani | H01J 49/0454 |
| 10,895,559 | B2 * | 1/2021 | Van Berkel | H01J 49/0431 |
| 11,085,854 | B2 * | 8/2021 | Zhao | G01N 1/24 |
| 11,205,566 | B2 * | 12/2021 | Jarrell | H01J 49/165 |
| 11,862,449 | B2 * | 1/2024 | Cahill | G01N 1/10 |
| 12,174,199 | B2 * | 12/2024 | Wang | G01N 30/7266 |
| 12,198,920 | B2 * | 1/2025 | Nishiguchi | H01J 49/0031 |
| 12,209,989 | B2 * | 1/2025 | Covey | G01N 1/405 |
| 12,531,224 | B2 * | 1/2026 | Covey | H01J 49/0404 |
| 12,546,753 | B2 * | 2/2026 | Cox | G01N 30/20 |
| 12,573,602 | B2 * | 3/2026 | Schneider | H01J 49/0027 |
| 12,586,771 | B2 * | 3/2026 | Kovarik | H01J 49/167 |
| 2002/0110902 | A1 * | 8/2002 | Prosser | G01N 35/10 435/287.1 |
| 2003/0193020 | A1 * | 10/2003 | Van Berkel | H01J 49/0463 250/288 |
| 2003/0201390 | A1 * | 10/2003 | Corso | B01J 20/103 250/288 |
| 2005/0145787 | A1 | 7/2005 | Prosser | |
| 2006/0071983 | A1 * | 4/2006 | Stearns | B41J 2/14008 347/68 |
| 2007/0039866 | A1 * | 2/2007 | Schroeder | C12Q 1/6869 210/265 |
| 2007/0175757 | A1 * | 8/2007 | Hanafusa | G01N 27/44756 204/601 |
| 2012/0053065 | A1 * | 3/2012 | Van Berkel | H01J 49/0431 435/7.1 |
| 2012/0079894 | A1 * | 4/2012 | Van Berkel | H01J 49/165 73/863.11 |
| 2013/0056631 | A1 | 3/2013 | Tomany et al. | |
| 2014/0283627 | A1 * | 9/2014 | Hattingh | H01J 49/0454 73/864.81 |
| 2014/0283628 | A1 * | 9/2014 | Hattingh | G01N 1/38 73/864.81 |
| 2016/0266017 | A1 * | 9/2016 | Kennedy | B01D 15/424 |
| 2019/0157060 | A1 | 5/2019 | Datwani et al. | |
| 2020/0264132 | A1 | 8/2020 | Furtaw et al. | |
| 2023/0036455 | A1 * | 2/2023 | Chu | B64G 1/105 |
| 2023/0063626 | A1 * | 3/2023 | Fujii | B05B 7/066 |
| 2024/0096614 | A1 | 3/2024 | Kovarik | |

FOREIGN PATENT DOCUMENTS

| | | |
|---|---|---|
| JP | 2003-217503 A | 7/2003 |
| WO | 00/19193 | 4/2000 |
| WO | 2018/045208 | 3/2018 |
| WO | 2021/140713 | 7/2021 |

OTHER PUBLICATIONS

PCT International Search Report and Written Opinion in International Application PCT/IB2022/057023, mailed Oct. 25, 2022, 14 pages.

PCT International Preliminary Report on Patentability in International Application PCT/IB2022/057023, mailed Feb. 15, 2024, 10 pages.

Semerjian, Hratch G., Ed., "ICLASS-91 NIST SP 813", NIST, National Institute of Standards and Technology, 96, Jul. 18, 1991, pp. 857-864.

Maxwell, Jane et al., "Decoupling CE and ESI for a more robust interface with MS", Electrphoresis, Verlag Chemie, Hoboken, NJ, USA, vol. 31, No. 7, Mar. 1, 2010, pp. 1130-1137.

* cited by examiner

LIQUID TRANSPORT SYSTEM HAVING MULTIPLE NEBULIZER NOZZLES

CROSS-REFERENCE TO RELATED APPLICATION

This application is a National Stage Application of PCT/IB2022/057023, filed on Jul. 28, 2022, which claims the benefit of U.S. Provisional Application No. 63/228,117, filed on Aug. 1, 2021, the entire disclosures of which are incorporated herein by reference in their entireties. To the extent appropriate, a claim of priority is made to each of the above disclosed applications.

BACKGROUND

Liquid transport systems for mass analysis devices such as mass spectrometers (MS) include, at a first end, an open port interface (OPI) and, at a second end, a nebulizer nozzle (e.g., an electrospray ionization (ESI) source or an atmospheric pressure chemical ionization (APCI) source). Known liquid transfer systems that include a single nebulizer nozzle are limited to a pressure drop that can be achieved by the atmospheric pressure pushing the liquid into the conduit of the liquid transfer system. Even under a condition of perfect vacuum generation at the end of the transfer conduit, a pressure drop of one atmosphere or 14.7 psi is at the most achievable. Under more realistic conditions, a pressure drop of only about ⅔ of an atmosphere (about 9 psi drop) is practically possible. Thus, the transport liquid flow rate is limited to that pressure drop.

SUMMARY

In one aspect, the technology relates to a liquid handling system for a mass spectrometer (MS), the liquid handling system including: an open port interface (OPI) including: a body defining a port and an internal volume; and at least one removal conduit disposed in the body and fluidically coupled to the internal volume; a plurality of transfer conduits fluidically coupled to the at least one removal conduit; and a plurality of nebulizer nozzles, wherein a single one of the plurality of nebulizer nozzles are fluidically coupled to each of the plurality of transfer conduits. In an example, at least a first one of the plurality of transfer conduits includes a length different than at least a second one of the plurality of transfer conduits. In another example, at least one of the plurality of nebulizer nozzles is communicatively coupled to a waste. In yet another example, at least one of the plurality of nebulizer nozzles is communicatively coupled to the MS. In still another example, at least one removal conduit includes a plurality of removal conduits, and wherein a single one of the plurality of transfer conduits is fluidically coupled to each of the plurality of removal conduits.

In another example of the above aspect, a pressure drop generated due to a flow of a nebulizer gas through the plurality of nebulizer nozzles draws a liquid disposed in the internal volume into the plurality of removal conduits. In an example, the plurality of removal conduits are centrally disposed within the body of the OPI. In another example, at least one of the plurality of transfer conduits includes a diameter different than another one of the plurality of transfer conduits.

In another aspect, the technology relates to a method of drawing into a liquid handling system a transport liquid received in an open port interface (OPI), the method including: introducing the transport liquid into an internal volume of the OPI; and generating a pressure drop at a plurality of nebulizer nozzles disposed remote from the OPI by ejecting a nebulizer gas from at least one of the plurality of nebulizer nozzles, wherein the generated pressure drop draws the transport liquid from the internal volume and into at least one removal conduit disposed in the OPI, and wherein the at least one removal conduit is fluidically coupled to the plurality of nebulizer nozzles. In an example, the method further includes ejecting the transport liquid from at least one nebulizer nozzle of the plurality of nebulizer nozzles and into a waste. In another example, at least one removal conduit includes a plurality of removal conduits, wherein a single one of the plurality of removal conduits is fluidically coupled to a single one of a plurality of transfer conduits that each terminate within a single one of the plurality of nebulizer nozzles, and wherein the method further includes ejecting the transport liquid from each of the plurality of transfer conduits so as to draw at least a portion of the transport liquid into each of the plurality of removal conduits. In yet another example, the method further includes introducing a sample into the transport liquid introduced into the internal volume of the OPI. In still another example, ejecting the transport liquid from at least one of the plurality of transfer conduits includes sequentially ejecting the received sample from at least two of the plurality of transfer conduits.

In another example of the above aspect, ejecting the transport liquid from at least one of the plurality of transfer conduits includes simultaneously ejecting the received sample from at least two of the plurality of transfer conduits. In an example, each of the plurality of transfer conduits terminates at an electrode.

In another aspect, the technology relates to a method of operating a mass spectrometer (MS) including an open port interface (OPI), the method includes ejecting a liquid from a plurality of nebulizer nozzles, wherein the plurality of nebulizer nozzles are fluidically coupled to the OPI. In an example, the method further includes analyzing, with the MS, the liquid ejected from a subset of the plurality of nebulizer nozzles. In another example, ejecting the liquid from the plurality of nebulizer nozzles includes ejecting the liquid from less than all of the plurality of nebulizer nozzles. In yet another example, ejecting the liquid from the plurality of nebulizer nozzles includes ejecting the liquid from at least one of the plurality of nebulizer nozzles into a waste. In still another example, the method further includes adjusting an inflow of the liquid into the OPI based at least in part on a number of the plurality of nebulizer nozzles ejecting the liquid.

DETAILED DESCRIPTION

Figure 1:
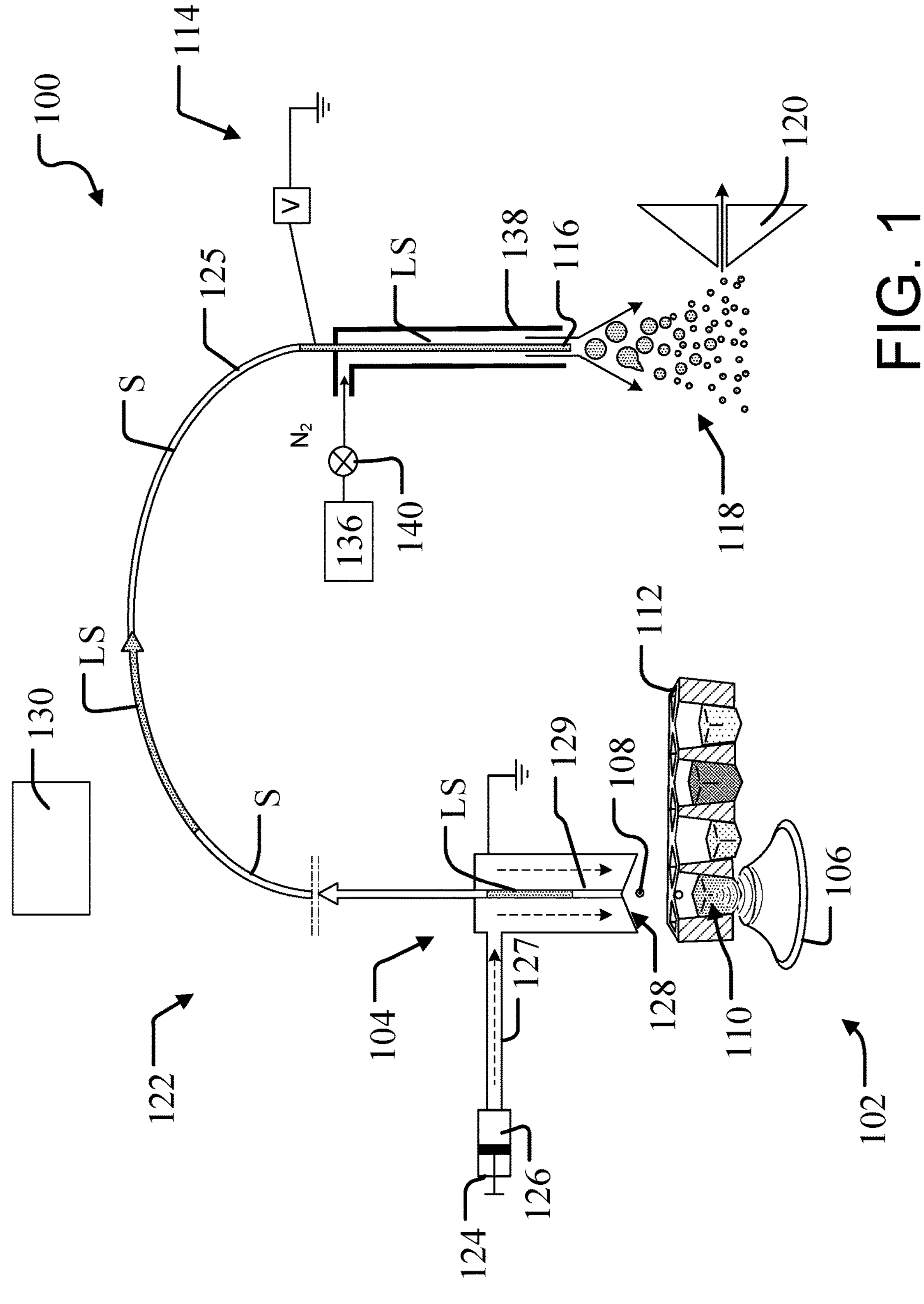
FIG. 1 is a schematic view of an example system combining acoustic droplet ejection (ADE) with an open port interface (OPI) sampling interface and electrospray ionization (ESI) source.

For illustrative purposes, FIG. 1 is a schematic view of an example system 100 combining an ADE 102 with an OPI sampling interface 104 and ESI source 114. The system 100 may be a mass analysis instrument such as a mass spectrometry device that is for ionizing and mass analyzing analytes received within an open end of the sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir of a well plate 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer nozzle 138 and electrospray electrode 116 of the ESI source 114, samples ejected therefrom are transformed into the gas phase. A liquid handling system 122 (e.g., including one or more pumps 124 and one or more transfer conduits 125) provides for the flow of liquid from a solvent reservoir 126 to the sampling OPI 104 and from the sampling OPI 104 to the ESI source 114. In further examples described below, multiple transfer conduits 125 fluidically coupled to one or more removal conduits 129 within the OPI 104 may be coupled to a plurality of ESI sources 114 (or other types of nebulizer nozzles) to improve the performance of the example system 100. As ESI sources 114 allow for the formation of multiple charged ions and are, therefore, more applicable to a variety of applications, they are described within the application for consistency. The technologies described herein, however, may also be utilized for systems that incorporate a plurality of atmospheric pressure chemical ionization (APCI) sources.

Returning to FIG. 1, the solvent reservoir 126 (e.g., containing a liquid, transport solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114. Flow out of the pump 124 may be adjusted, for example, based on the number of ESI sources 114 operating at a given time.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to and configured to operate any aspect of the system 100. This enables the acoustic transducer of the ADE 106 to inject droplets 108 into the sampling OPI 104 as otherwise discussed herein substantially continuously or for selected portions of an experimental protocol by way of non-limiting example. Other types of sample introduction systems, such as gravity-based droplet systems may be utilized. ADE 102 and other non-contact ejection systems are particularly advantageous, however, because of the high sample throughput that may be achieved. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer nozzle 138 that surrounds the outlet tip of the electrospray electrode 116. As depicted, the electrospray electrode 116 protrudes from a distal end of the nebulizer nozzle 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include liquid samples LS received from each reservoir 110 of the well plate 112. The liquid samples LS are diluted with the solvent S and typically separated from other samples by volumes of the solvent S (hence, as flow of the solvent S moves the liquid samples LS from the OPI 104 to the ESI source 114, the solvent S may also be referred to herein as a transport liquid). The nebulizer gas can be supplied at a variety of flow rates, for example, in a range from about 0.1 L/min to about 40 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect/shock formation). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

OPI sample transport flow relies on pressure differential set up across the transfer conduit 125 by nebulizer gas expanding past the transfer conduit 125 termination, e.g., at electrospray electrode 116, though nebulizers nozzles that do not use electrospray electrodes (e.g., APCI) are also contemplated for use with the technologies described herein. Nebulizer gas is expanding from the nebulizer nozzle 138, the nozzle size and nebulizer gas pressure determine the gas flowrate through the nozzle 138. Increasing the nebulizer gas flowrate generally improves the vacuum at the transfer conduit 125 termination and hence the pressure differential across the transfer conduit 125. Increasing the pressure differential (e.g., higher vacuum at the nozzle 138) increases the transport flow and improves sample throughput.

Figure 2:
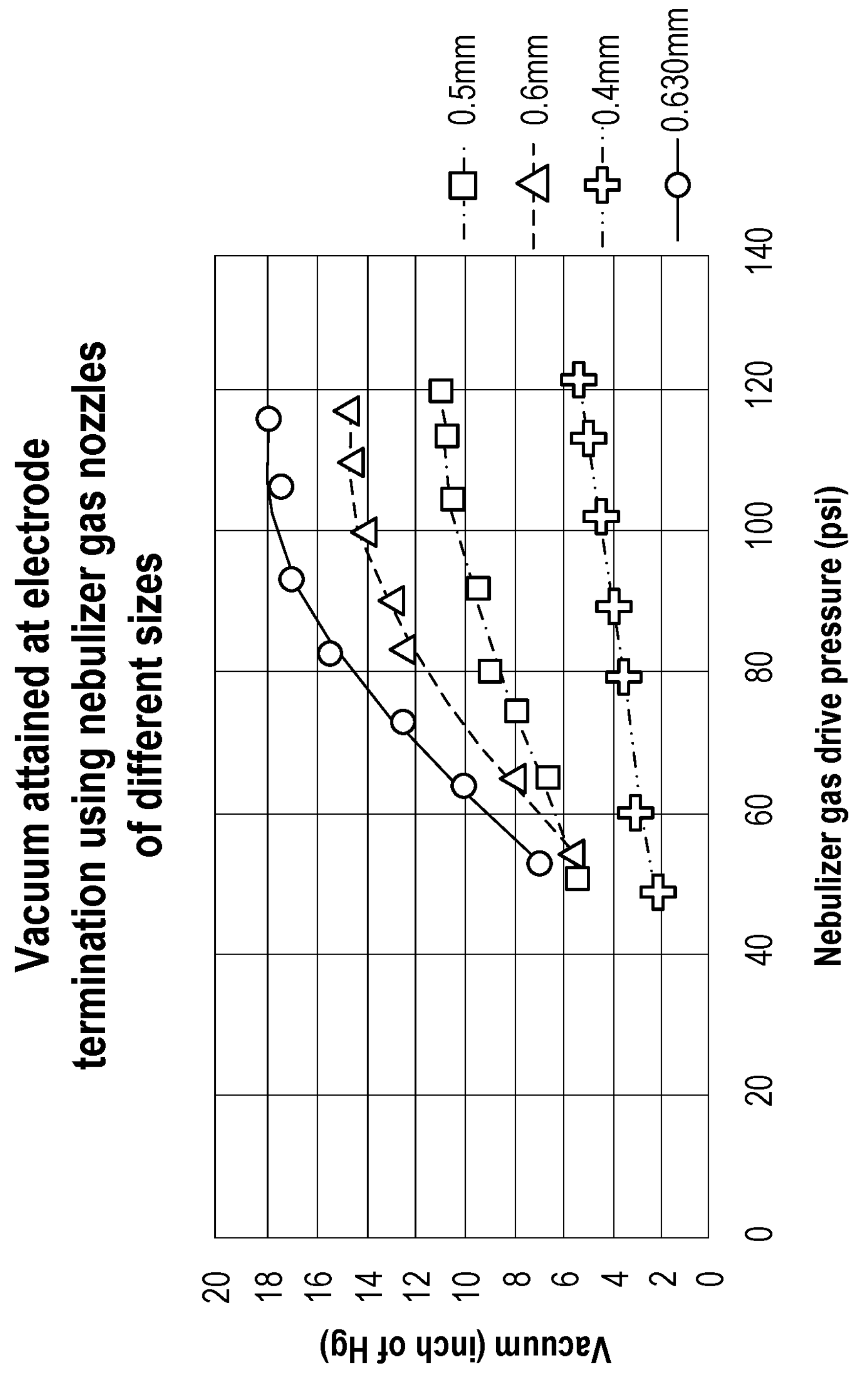
FIG. 2 depicts a vacuum variation at the end of a transfer conduit with the nebulizer drive pressure for a range of nozzle diameters.

FIG. 2 depicts a vacuum variation at the end of the transfer conduit mapped with the nebulizer drive pressure for the different sizes of nozzles. If a given pressure of the nebulizer drive gas is maintained, vacuum improves with the increase of the nozzle diameter, as depicted. As the nozzle diameter Ø increases from 0.4 to 0.6 mm, the vacuum improves by about 2.5 times, providing a substantially proportional improvement in throughput. Although efficiency of the vacuum generation drops (e.g., the slope flattens) for the larger nozzles near the top end of the nebulizer gas drive pressure range. This flattening of the slope is indicative of the larger nozzles reaching a vacuum limit in that region.

Figure 3:
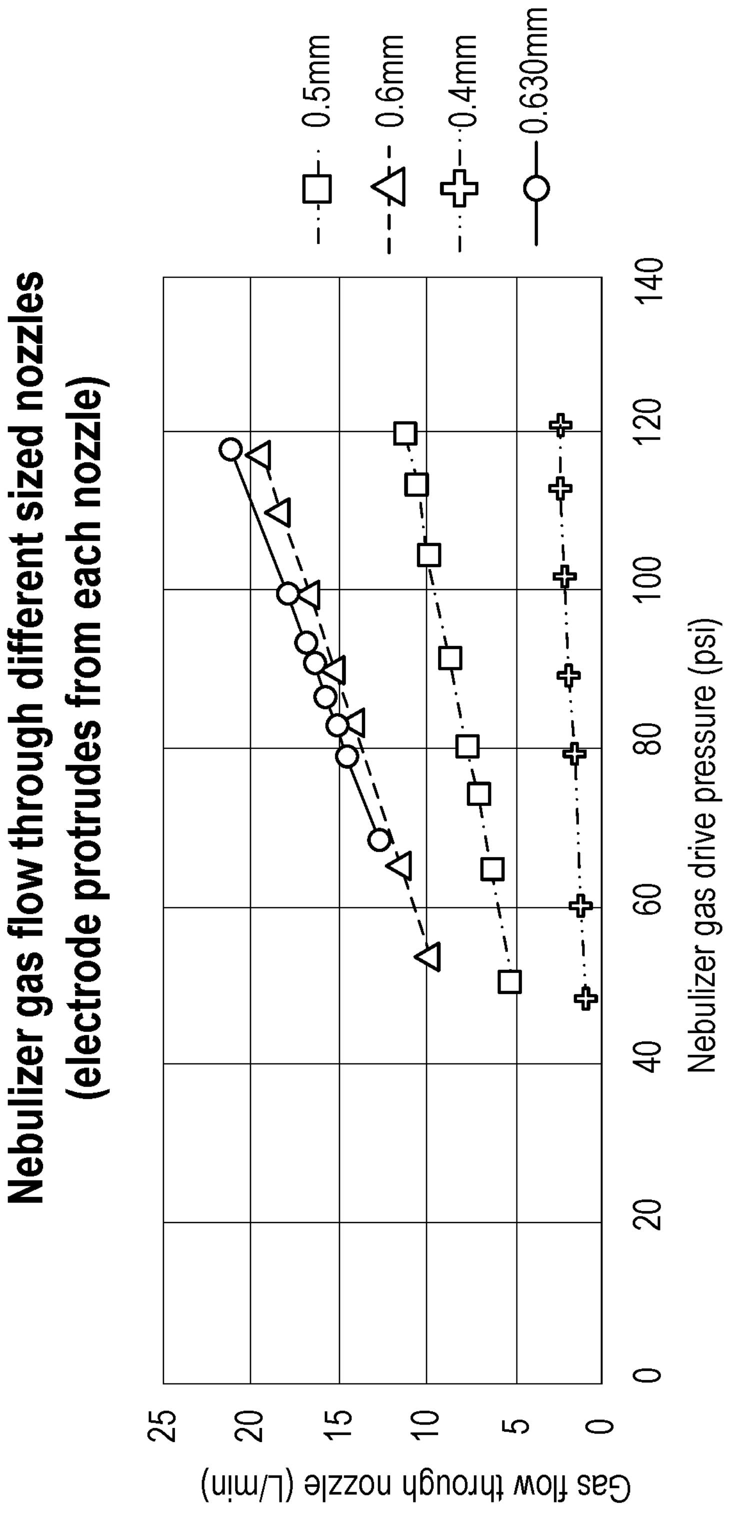
FIG. 3 depicts a plot of gas flow dependence on drive pressure for a range of nozzle diameters.
Figure 4A:
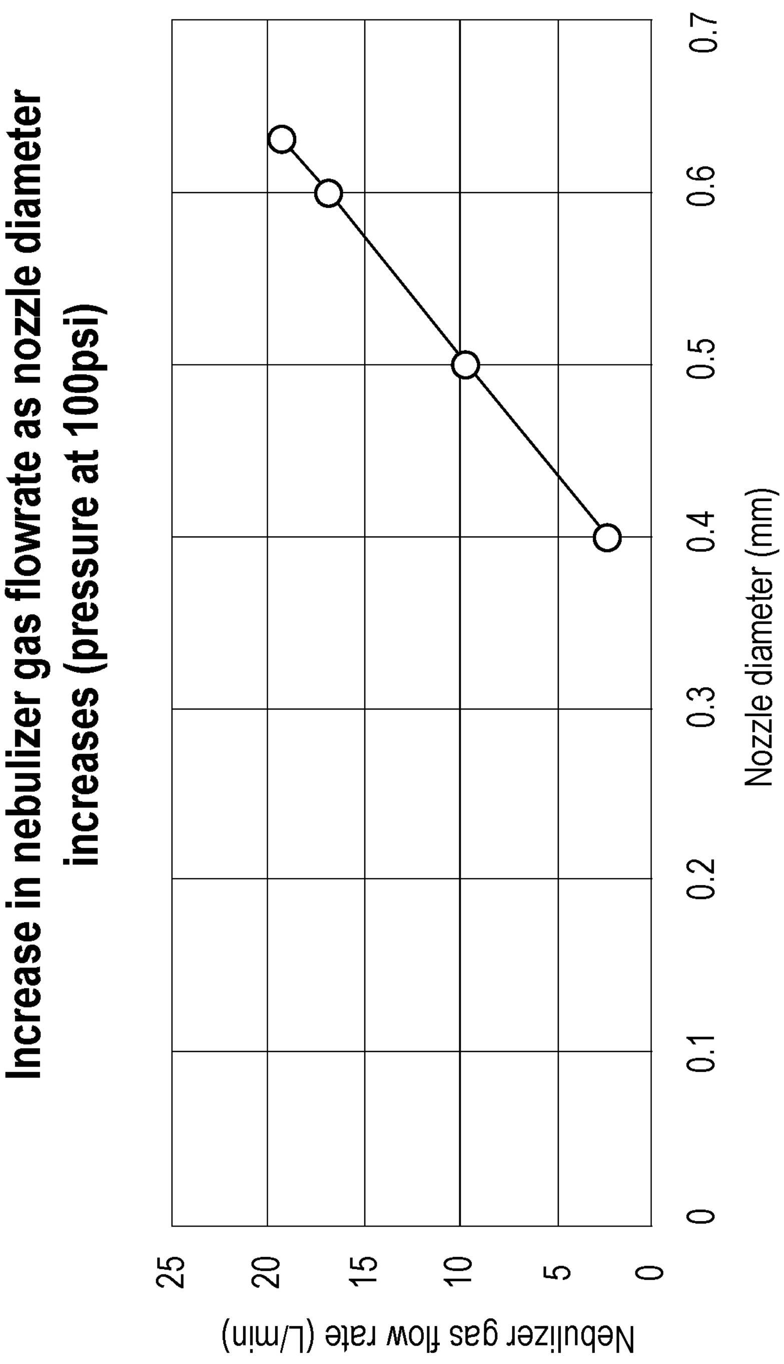
FIG. 4A depicts a relationship between vacuum pressure drop and nebulizer gas flow.

As the nebulizer nozzle diameter gets larger, so does the gas flow therethrough. FIG. 3 depicts a plot of gas flow dependence on drive pressure for a range of nozzle diameters (Ø=0.4, 0.5, 0.6, and 0.63 mm). As can be seen, the relationship over the range depicted is linear, indicating a sonic expansion regime. The slope increases with the size of the nozzle. Thus, in order to maintain the pressure drop for the nebulizer drive gas across a larger diameter nozzle, significantly more gas flow is needed. The plot allows comparison of nebulizer gas flows for different sized nozzles, as an example, at 100 psi nebulizer gas pressure, the flow increase as nozzle diameter expands is depicted in FIG. 4A. The "x-axis" intercept depicts the diameter of the protruding electrode (e.g., 116 in FIG. 1). The before-mentioned vacuum improvement of about 2.5 times as the nozzle diameter increases from 0.4 to 0.6 mm requires about 8 times the nebulizer gas flow. Thus, to achieve a small improvement in vacuum, greater volumes of drive gas are needed at the drive pressure. Most compressors are designed to deliver large volumes of gas flow at low pressures or small amounts of flow at high pressures, but few are able to deliver both. As such, it presents a significant challenge to supply the nebulizer nozzle for the high-pressure differentials across the transfer conduit.

Figure 4B:
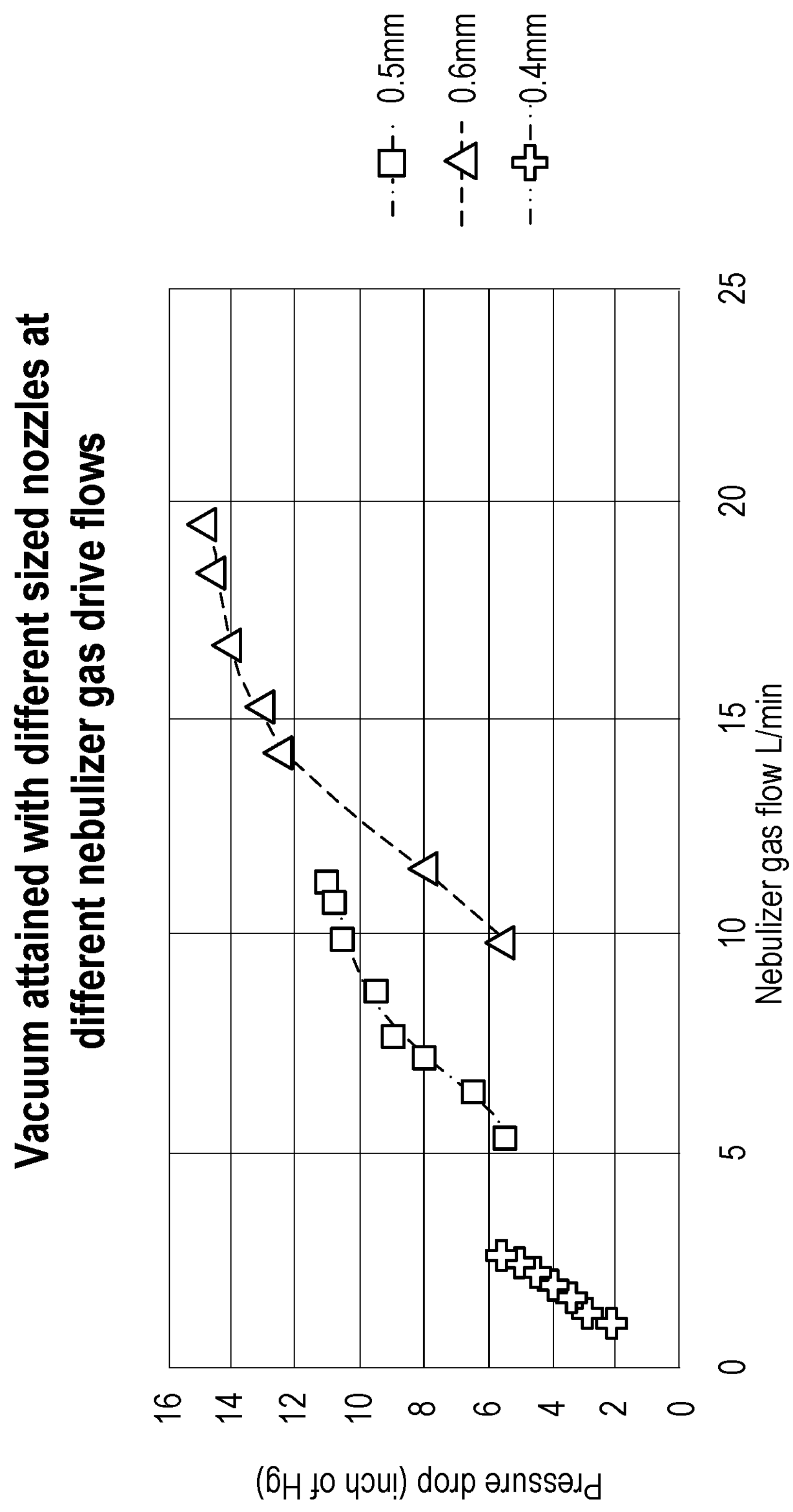
FIG. 4B depicts a relationship between nebulizer gas consumption required to achieve a given level of vacuum at a transfer conduit terminus.

FIG. 4B depicts a different visualization of the relationship between nebulizer gas consumption required to achieve a given level of vacuum at the transfer conduit terminus; it depicts the relationship between vacuum pressure drop and nebulizer gas flow. For example, if a pressure drop of about 6" of Hg (about 3 psi) is considered, FIG. 4B indicates that significantly less drive gas flow is needed with the nozzle Ø 0.4 mm, e.g., about four times less for nozzle Ø 0.4 mm versus 0.6 mm. Therefore, if an OPI system is based on multiple nebulizer nozzles and multiple sample transport conduits, an OPI port could be operated at total transport liquid flows corresponding to a given vacuum with significantly less nebulizer drive flow. In the context of FIG. 4B, for example, a liquid transport system utilizing three nozzles Ø 0.4 mm would produce a pressure drop of about 6" of Hg at each nozzle, each nozzle driving a transport liquid flow rate at that pressure drop. If the three transfer conduits were combined to empty a common port, a transport liquid flow rate equivalent to 18" of Hg could be maintained with a nebulizer gas flow of about 7 L/min, as compared to a system utilizing a single nozzle Ø 0.6 mm, which would produce a pressure drop of about 15" of Hg, with a nebulizer gas flow of almost 20 L/min.

Multiple nebulizer nozzles can be combined to increase the effective pressure drop evacuating an OPI port and/or achieve a given pressure drop with a limited nebulizer gas flow. The two functions can also be combined as to achieve maximum pressure drop with a minimal nebulizer gas flow. The number of nozzles and their diameters, within a multi-nozzle combination, may be set (optimized) for a given application and/or to fit external constraints. Higher combined transport liquid flows allow faster liquid turn-over within the OPI port and result in reduced sample peak widths. Hence, faster draining of the OPI port directly improves throughput.

Figure 5:
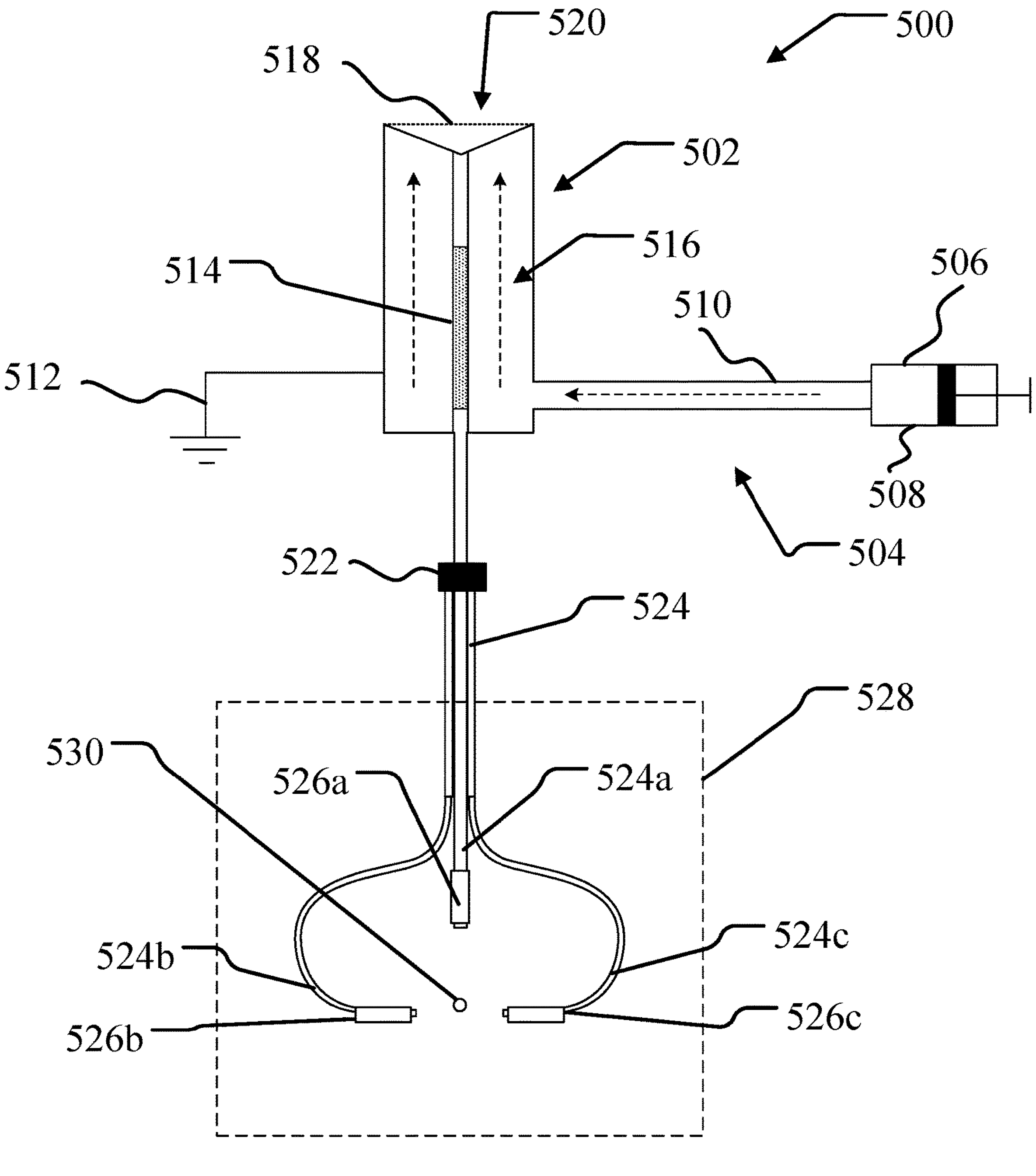
FIG. 5 depicts an example of a liquid transport system.

FIG. 5 depicts an example of a fluid transport system 500, for example for use in a mass analysis instrument such as a mass spectrometer (MS), differential mobility spectrometer (DMS), or a combination DMS-MS. The system 500 includes an OPI 502 connected to a transport liquid supply system 504 having a pump 506, a transport liquid source 508, and a transport liquid supply conduit 510. The OPI 502 is grounded via an electrical contact 512. In this example, the OPI 502 includes a single removal conduit 514 disposed within an internal volume 516 of the OPI 502. A transport liquid (indicated by arrows in FIG. 5) is introduced via the pump 506 to the internal volume, where it forms a meniscus 518 at the port 520 of the OPI 504. Into the port 520 may be introduced one or more samples, which may be ejected from a contactless ejector (e.g., such as an ADE), dropped via gravity from a pipette, electro deposition (where OPI 502 may not be electrically grounded) or transferred via direct contact with an instrument holding a sample fluid. In examples, the OPI 502 may be configured with the port 520 facing downward, for example, as depicted in FIG. 1, as is typical with an upwardly-ejecting ADE.

The removal conduit 514 is coupled to a manifold 522 or other single-inlet, multiple-outlet fitting, which may be disposed at the OPI 502 or distal therefrom (e.g., as depicted in FIG. 5). The manifold 522 communicatively couples the removal conduit 514 to a plurality of transfer conduits (depicted bundled at 524). The location of the manifold 522 between the removal conduit 514 and transfer conduits 524 may be used to reduce sample band broadening and hence sample peak width. The manifold 522 may also control the sample transit time through the removal conduit 514 and transfer conduits 524. A nebulizer nozzle 526 is fluidically coupled to a single one of the transfer conduits 524. Each transfer conduit 524 may terminate at an electrode (e.g., for ESI), or at a terminus lacking an electrode (e.g., for APCI). In systems 500 utilizing multiple transfer conduits 524, one of more of the conduits 524 may be of a different length than the others, or the conduits may be of the same length. For example, in FIG. 5, the transfer conduits 524*b*, 524*c* are longer than the transfer conduit 524*a*. Systems that utilize multiple transfer conduits and nebulizer nozzles, in one example, may be matched to achieve a simultaneous arrival of a split single sample droplet introduced at the OPI 502 at an MS orifice 530. In other examples, a range of arrival times may be acceptable if the final peak width of the sample is within a desired throughput regime. The practical set up of a multi-nozzle system such as depicted in FIG. 5 may benefit from the relatively wide range of OPI flows delivering the best peak width and relatively constant transport speed over the similar range of flows. These OPI flow properties may help to achieve signal synchronization. Alternatively, the transport conduits may be configured (e.g., as to length, diameter, or flow rate therethrough) to deliver a pulse train of staggered peaks from a single sample droplet, e.g., a first portion of a sample ejected from a first nebulizer, followed thereafter by a second portion of the sample from a second nebulizer, a third from a third, and so on. While this may have an impact on the ultimate sample throughput, it may offer an advantage in signal detection and/or isolation. Another aspect of the system could monitor signal primarily from only one of the nozzles, considering others as secondary, or disregarding certain nozzles entirely. An example of unmonitored or disregarded nozzles is described below in the context of FIG. 6, but could also be incorporated into the single removal conduit/multiple transport conduit example depicted in FIG. 5.

Figure 6:
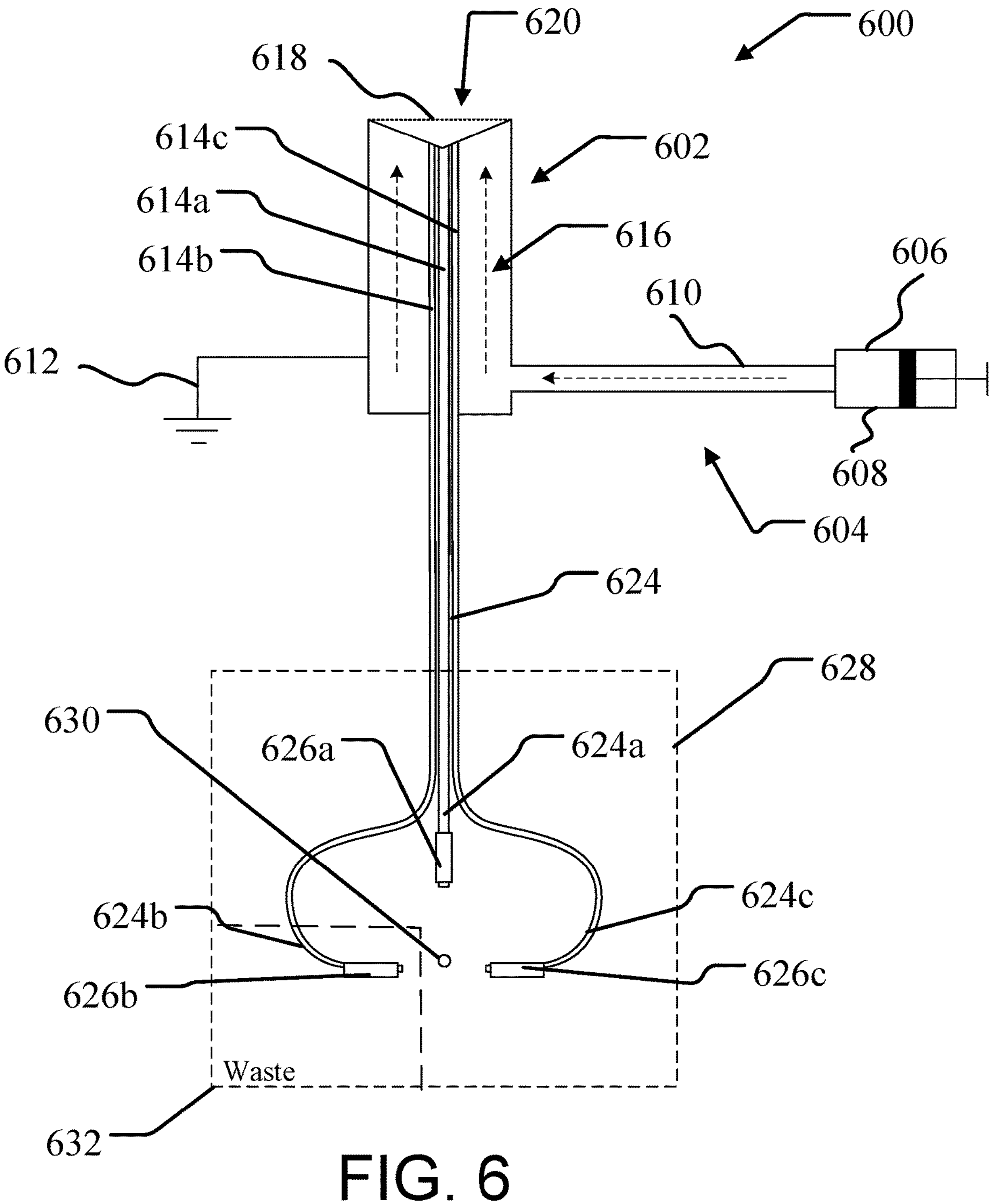
FIG. 6 depicts another example of a liquid transport system.

FIG. 6 depicts another example of a fluid transport system 600, for use in a mass analysis instrument. A number of features are described above with regard to FIG. 5 and, as such, are not necessarily described further. The system 600 includes an OPI 602 connected to a transport liquid supply system 604 having a pump 606, a transport liquid source 608, and a transport liquid supply conduit 610. The OPI 602 is grounded via an electrical contact 612. One difference between the example depicted in FIG. 5 versus the example of FIG. 6 is in the number of removal conduits 614. Here, a plurality of removal conduits 614 are disposed within an internal volume 616 of the OPI 602, and each is fluidically coupled to an associated single transfer conduit 624 and nebulizer nozzle 626. More specifically, removal conduit 614*a* is coupled to transfer conduit 624*a*, which is coupled to nozzle 626*a*; removal conduit 614*b* is coupled to transfer conduit 624*b*, which is coupled to nozzle 626*b*; and removal conduit 614*c* is coupled to transfer conduit 624*c*, which is coupled to nozzle 626*c*. In yet another example, each of the multiple removal conduits 614 may be fluidically coupled to a plurality of nozzle 626. A transport liquid (depicted by arrows) forms a meniscus 618 at the port 620 of the OPI 602, into which one or more samples may be introduced via the techniques described above. As with the example of FIG. 5, the transfer conduits 624 may be of the same or different lengths, for reasons such as described above. Further, in this example, the discharge from the nebulizer nozzle 626*b* is to a waste container 632, which is discrete from the MS orifice 630. As such, this configuration allows for control of dilution of a sample within the OPI 602, an essential step for reducing ion suppression due to samples in complex matrices. In another example, a plurality of nozzles 626 may be unmonitored and discharged into the waste container 632. This configuration may also be incorporated into the single removal conduit/multiple transfer conduit configuration depicted in FIG. 5.

In FIG. 6, the plurality of removal conduits 614 are depicted substantially aligned with a central axis of the OPI 602. In other examples, the arrangement of the removal conduits 614 within the OPI 602 may also be used to control the sample evacuation from the OPI 602, for example by eliminating "stagnant" flow areas near the perimeter of the OPI 602. In another example, one or more of the removal conduits 614 may be positioned to reduce the necessary alignment between an acoustic ejection module and the OPI 602, since the multiple removal conduits 614 would enlarge the sample primary capture zone. For example, one of the plurality of removal conduits may align with a sample droplet better than just a single removal conduit, if only a single removal conduit was used. The configuration of FIG. 6 may also benefit from an improved signal sensitivity, which would result in a more favorable flowrate for sample ionization and detection than operating at a total (larger) flow from a single or multiple nozzles.

Figure 7:
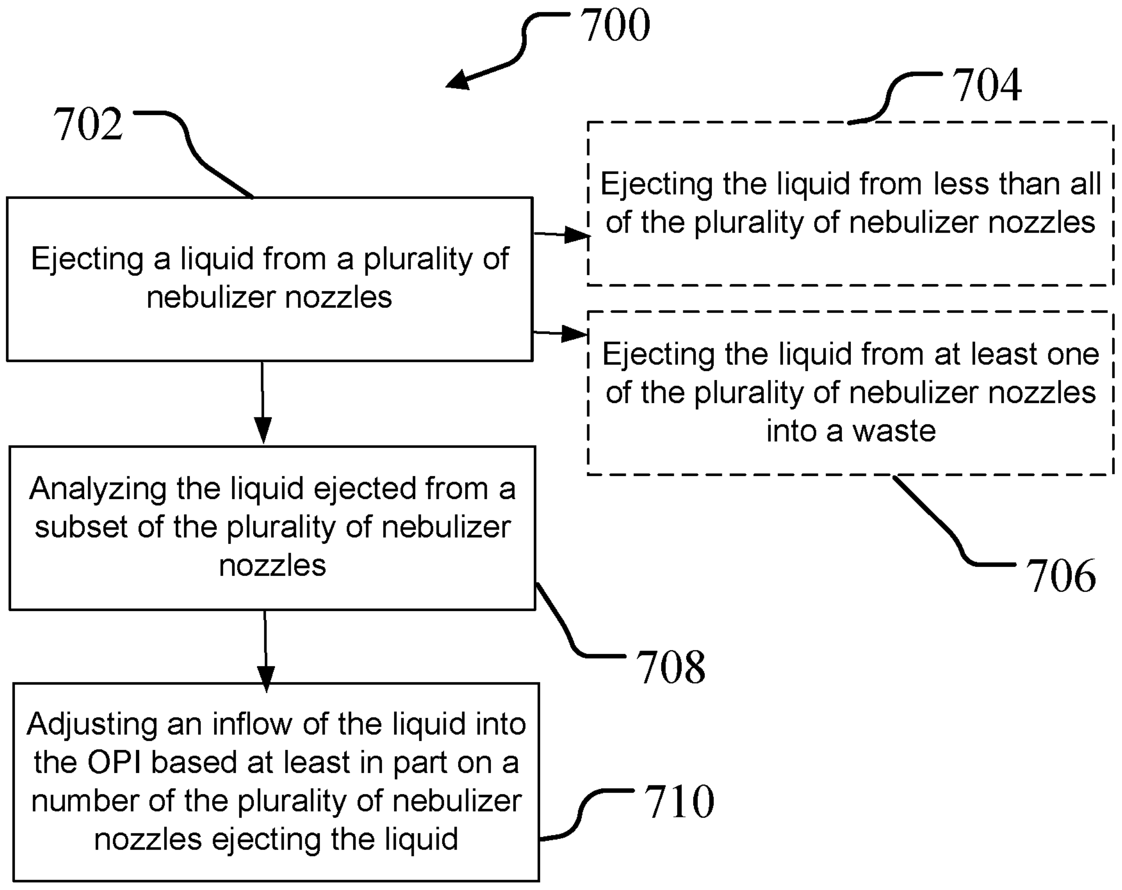
FIG. 7 depicts a method of operating a mass analysis system.

FIG. 7 depicts a method 700 of operating an analysis system, such as an MS, DMS, or DMS-MS. Relevant to the method 700, the analysis system may include at least an OPI and a plurality of nebulizer nozzles. The method 700 begins with ejecting a liquid from the plurality of nebulizer nozzles, operation 702. These nebulizer nozzles are fluidically coupled to the OPI into which a transport liquid and samples are introduced. In an example, ejecting the liquid (e.g., a sample diluted in the transport liquid) from the plurality of nebulizer nozzles includes optional operation 704, ejecting the liquid from less than all of the plurality of nebulizer nozzles. In another example, ejecting the liquid from the plurality of nebulizer nozzles includes optional operation 706, ejecting the liquid from at least one of the plurality of nebulizer nozzles into a waste. The liquid discharged from the nebulizer nozzles are analyzed by the analysis instrument and, as described elsewhere herein, all or fewer than all of the plurality of nebulizer nozzles may be monitored. For example, in operation 708, the liquid ejected from a subset of the plurality of nebulizer nozzles is analyzed. Each of the plurality of nebulizer nozzles may be controlled individually, thereby controlling the amount of liquid drawn from the OPI. As such, operation 710 contemplates adjusting an inflow of the liquid into the OPI based at least in part on a number of the plurality of nebulizer nozzles ejecting the liquid. The greater the number of nebulizer nozzles utilized, the greater the flow of liquid through the OPI.

Figure 8:
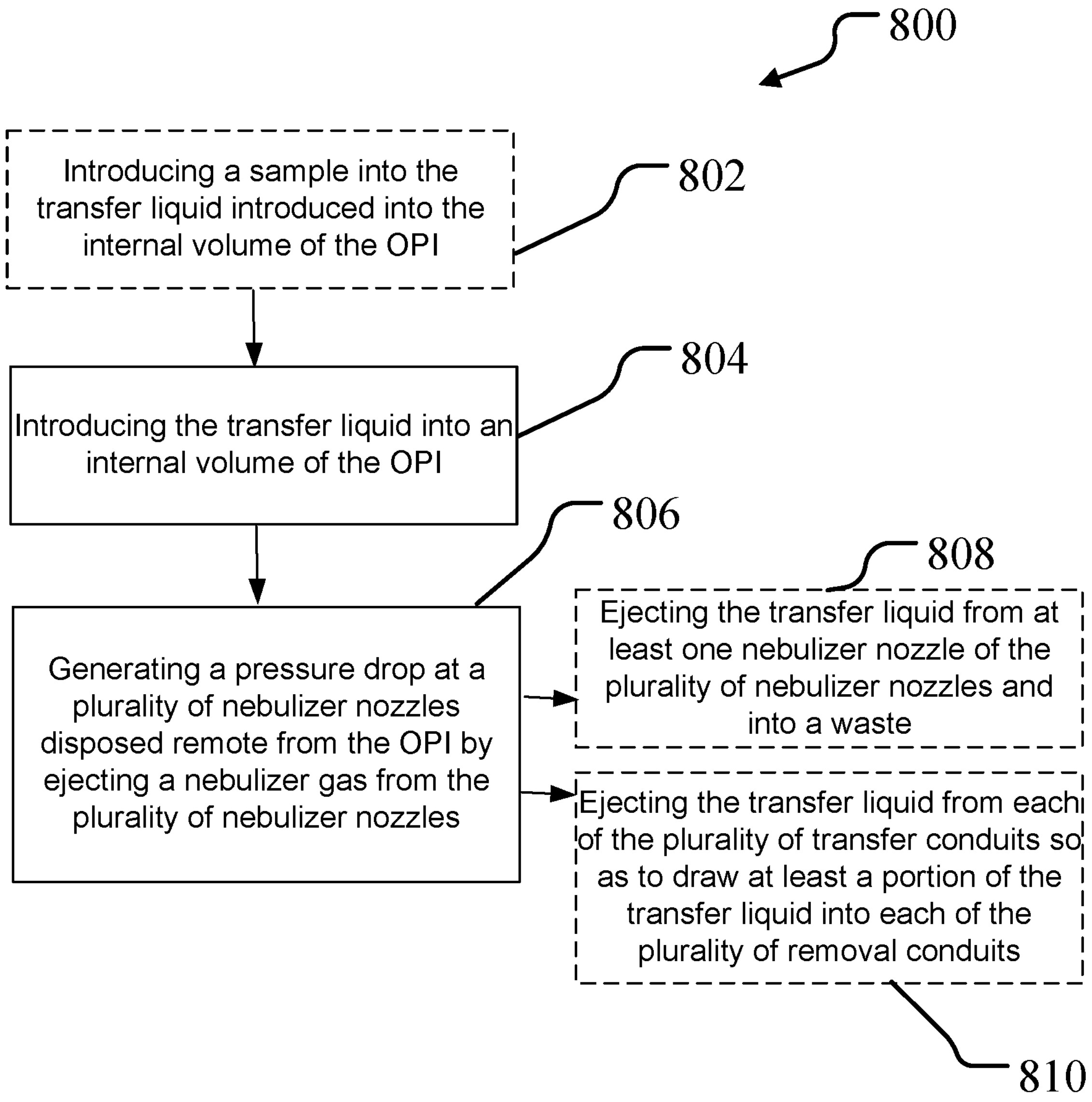
FIG. 8 depicts a method of drawing liquid into a liquid transport system.

FIG. 8 depicts a method 800 of drawing into a liquid handling system a transport liquid received in an OPI. The method may begin with optional operation 802, introducing a sample into the transport liquid introduced into an internal volume of the OPI. During operation of a mass analysis system, operation 802 is performed substantially simultaneously with operation 804, introducing the transport liquid into the internal volume of the OPI. As described elsewhere herein, in operation 806, a pressure drop is generated at a plurality of nebulizer nozzles disposed remote from the OPI.

This is generated by ejecting a nebulizer gas from the plurality of nebulizer nozzles, where the resultant generated pressure drop draws the transport liquid from the internal volume and into at least one removal conduit disposed in the OPI. Depending on the configuration, the at least one removal conduit is fluidically coupled to the plurality of nebulizer nozzles, e.g., via a manifold. In other examples, a plurality of removal conduits may be present in the OPI, and each may be coupled to one or more nebulizer nozzles. A number of different ejection configurations are described herein. In one example relevant to this method 800, operation 808 includes ejecting the transport liquid and diluted sample from at least one nebulizer nozzle of the plurality of nebulizer nozzles and into a waste. In another example, depicted in operation 810, at least one removal conduit includes a plurality of removal conduits, and a single one of the plurality of removal conduits is fluidically coupled to a single one of a plurality of transfer conduits. Each of these transfer conduits terminate within a single one of the plurality of nebulizer nozzles and, in the case of ESI, may terminate at an electrode. In operation 810 the transport liquid is ejected from each of the plurality of transfer conduits so as to draw at least a portion of the transport liquid and diluted sample into each of the plurality of removal conduits. With the multi-nozzle systems described herein, the ejected transport liquid may be sequentially or simultaneously ejected.

Figure 9:
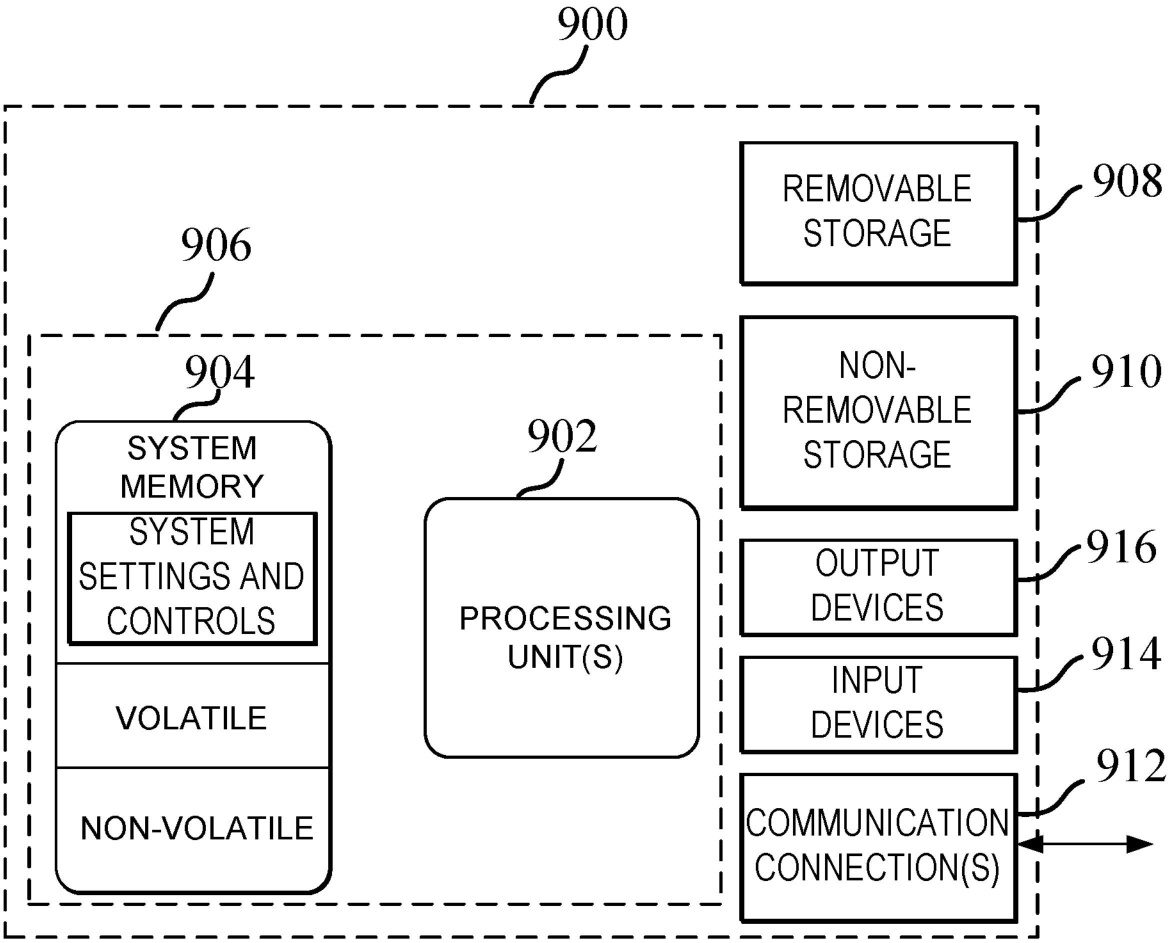
FIG. 9 depicts an example of a suitable operating environment in which one or more of the present examples can be implemented.

FIG. 9 depicts one example of a suitable operating environment 900 in which one or more of the present examples can be implemented. This operating environment may be incorporated directly into the controller for a mass spectrometry or other mass analysis system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, handheld or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, instructions to control the transport liquid pump, sensors, valves, gas source, nebulizer nozzles, etc., or perform other methods disclosed herein) can be volatile (such as RAM), non-volatile (such as ROM, flash memory, etc.), or some combination of the two. This most basic configuration is illustrated in FIG. 9 by dashed line 906. Further, environment 900 can also include storage devices (removable, 908, and/or non-removable, 910) including, but not limited to, magnetic or optical disks or tape. Similarly, environment 900 can also have input device(s) 914 such as touch screens, keyboard, mouse, pen, voice input, etc., and/or output device(s) 916 such as a display, speakers, printer, etc. Also included in the environment can be one or more communication connections 912, such as LAN, WAN, point to point, Bluetooth, RF, etc.

Operating environment 900 typically includes at least some form of computer readable media. Computer readable media can be any available media that can be accessed by processing unit 902 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 900 is part of a network that stores data in remote storage media for use by the computer system 900.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A liquid handling system for a mass spectrometer (MS), the liquid handling system comprising:
an open port interface (OPI) comprising:
a body defining a port and an internal volume; and
a plurality of removal conduits centrally disposed within the body of the OPI and fluidically coupled to the internal volume;
a plurality of transfer conduits, wherein a single one of the plurality of transfer conduits is fluidically coupled to only one of the plurality of removal conduits; and
a plurality of nebulizer nozzles, wherein a single one of the plurality of nebulizer nozzles are fluidically coupled to each of the plurality of transfer conduits.

2. The liquid handling system of claim 1, wherein at least a first one of the plurality of transfer conduits comprise a length different than at least a second one of the plurality of transfer conduits.

3. The liquid handling system of claim 1, wherein at least one of the plurality of nebulizer nozzles is communicatively coupled to a waste.

4. The liquid handling system of claim 1, wherein at least one of the plurality of nebulizer nozzles is communicatively coupled to the MS.

5. The liquid handling system of claim 1, wherein a pressure drop generated due to a flow of a nebulizer gas through the plurality of nebulizer nozzles draws a liquid disposed in the internal volume into the plurality of removal conduits.

6. The liquid handling system of claim 1, wherein at least one of the plurality of transfer conduits comprises a diameter different than another one of the plurality of transfer conduits.

7. A liquid handling system for a mass spectrometer (MS), the liquid handling system comprising:
an open port interface (OPI) comprising:
a single body defining:
a sample-receiving port at a first end of the single body;
an internal volume extending away from the port; and
a supply conduit port for receiving a solvent from a solvent reservoir,
wherein the supply conduit port is fluidically coupled to the internal volume of the single body; and
a plurality of removal conduits disposed in the single body of the OPI and fluidically coupled to the internal volume of the OPI, wherein the plurality of removal conduits extend from the internal volume of the OPI to an exterior of the OPI, though the single body, and wherein a capture end of at least one of the plurality of removal conduits is disposed adjacent the sample-receiving port.

8. The liquid handling system of claim 7, further comprising:
a plurality of transfer conduits, wherein a single one of the plurality of transfer conduits is fluidically coupled to only one of the plurality of removal conduits; and
a plurality of nebulizer nozzles, wherein a single one of the plurality of nebulizer nozzles are fluidically coupled to each of the plurality of transfer conduits.

9. The liquid handling system of claim 8, wherein at least a first one of the plurality of transfer conduits comprise a length different than at least a second one of the plurality of transfer conduits.

10. The liquid handling system of claim 8, wherein at least one of the plurality of nebulizer nozzles is communicatively coupled to a waste.

11. The liquid handling system of claim 8, wherein at least one of the plurality of nebulizer nozzles is communicatively coupled to the MS.

12. The liquid handling system of claim 8, wherein a pressure drop generated due to a flow of a nebulizer gas through the plurality of nebulizer nozzles draws a liquid disposed in the internal volume into the plurality of removal conduits.

13. The liquid handling system of claim 8, wherein at least one of the plurality of transfer conduits comprises a diameter different than another one of the plurality of transfer conduits.

14. The liquid handling system of claim 7, wherein the plurality of removal conduits are centrally disposed within the single body of the OPI.

15. The liquid handling system of claim 7, wherein the plurality of removal conduits are centrally disposed near a perimeter of the single body of the OPI.

* * * * *